US009110908B2

(12) United States Patent
Srikrishna et al.

(10) Patent No.: US 9,110,908 B2
(45) Date of Patent: *Aug. 18, 2015

(54) IDENTIFICATION OF FILES OF A COLLABORATIVE FILE STORAGE SYSTEM HAVING RELEVANCE TO A FIRST FILE

(71) Applicant: Python4Fun, Inc., San Mateo, CA (US)

(72) Inventors: Devabhaktuni Srikrishna, San Francisco, CA (US); Marc A. Coram, Stanford, CA (US); Christopher Hogan, San Mateo, CA (US)

(73) Assignee: Python4Fun, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/088,353

(22) Filed: Nov. 23, 2013

(65) Prior Publication Data

US 2014/0081963 A1    Mar. 20, 2014

Related U.S. Application Data

(63) Continuation of application No. 13/438,251, filed on Apr. 3, 2012, now Pat. No. 8,612,496.

(51) Int. Cl.
*G06F 17/30* (2006.01)

(52) U.S. Cl.
CPC .... *G06F 17/30106* (2013.01); *G06F 17/30011* (2013.01)

(58) Field of Classification Search
USPC .................. 707/3, 5, 709; 717/106; 345/635; 375/240.01
See application file for complete search history.

(56) References Cited

U.S. PATENT DOCUMENTS

| 5,752,020 | A | 5/1998 | Ando |
| 6,181,342 | B1 * | 1/2001 | Niblack ........................ 345/635 |
| 6,327,590 | B1 | 12/2001 | Chidlovski et al. |
| 6,981,210 | B2 | 12/2005 | Peters et al. |
| 7,231,375 | B2 * | 6/2007 | Ratnaparkhi et al. ............ 706/12 |
| 7,493,322 | B2 * | 2/2009 | Franciosa et al. ...................... 1/1 |
| 7,707,808 | B2 | 4/2010 | Schmelzer |
| 8,533,232 | B1 | 9/2013 | Hartman et al. |
| 8,776,012 | B2 * | 7/2014 | Bhogal et al. .................. 717/106 |
| 2004/0117732 | A1 | 6/2004 | McNeill et al. |
| 2005/0097173 | A1 | 5/2005 | Johns et al. |
| 2005/0216429 | A1 | 9/2005 | Hertz et al. |
| 2006/0271561 | A1 | 11/2006 | Schlachta-Fairchild et al. |
| 2007/0011142 | A1 * | 1/2007 | Sattler et al. ....................... 707/3 |
| 2007/0288455 | A1 | 12/2007 | Hsu |
| 2008/0109808 | A1 | 5/2008 | Wing et al. |
| 2008/0263103 | A1 | 10/2008 | McGregor et al. |
| 2009/0177631 | A1 * | 7/2009 | Ohwada ............................ 707/3 |

(Continued)

*Primary Examiner* — Etienne Leroux
(74) *Attorney, Agent, or Firm* — Brian R. Short

(57) ABSTRACT

Methods and systems for providing related files in a collaborative file storage system are disclosed. One method includes identifying a plurality of files within the collaborative file storage system, wherein the plurality of files each have a relationship with the first file, and wherein the collaborative file storage system allows sharing of the plurality of files between multiple users through a network. The method further includes generating, by a system server, a list of inquiries based on the plurality of files, providing, by the system server, the list of inquiries to at least one collaborator of the first file, receiving from the at least one collaborator at least one response to the list of inquiries, selecting a subset of the plurality of files based on the at least one response, and storing information related to the selected subset of the plurality of files for access if the first file is selected.

20 Claims, 10 Drawing Sheets

(56) References Cited

U.S. PATENT DOCUMENTS

| | | |
|---|---|---|
| 2009/0265737 A1 | 10/2009 | Issa et al. |
| 2009/0287655 A1 | 11/2009 | Bennett |
| 2009/0292685 A1 | 11/2009 | Liu et al. |
| 2009/0327272 A1* | 12/2009 | Koivunen .................. 707/5 |
| 2010/0145958 A1 | 6/2010 | Duffy et al. |
| 2010/0195712 A1* | 8/2010 | Yu et al. .................. 375/240.01 |
| 2011/0035674 A1 | 2/2011 | Chenoweth et al. |
| 2011/0087658 A1 | 4/2011 | Lunt |
| 2011/0096014 A1 | 4/2011 | Fuyuno et al. |
| 2011/0119243 A1 | 5/2011 | Diamond et al. |
| 2011/0145219 A1* | 6/2011 | Cierniak et al. .............. 707/709 |
| 2011/0161345 A1 | 6/2011 | Dworkin et al. |
| 2011/0231104 A1 | 9/2011 | Lambert |
| 2011/0307491 A1 | 12/2011 | Fisk |
| 2011/0314049 A1 | 12/2011 | Poirier et al. |
| 2012/0066201 A1 | 3/2012 | Suman et al. |
| 2012/0078945 A1 | 3/2012 | Hurst |
| 2012/0084629 A1 | 4/2012 | Patrawala et al. |
| 2012/0113273 A1 | 5/2012 | Rothschild |
| 2012/0158747 A1 | 6/2012 | Satow et al. |
| 2012/0221687 A1 | 8/2012 | Hunter et al. |
| 2012/0233152 A1 | 9/2012 | Vanderwende et al. |

* cited by examiner

200

Are any of the following updates to World Wide Web relevant to your paper? (i.e. Chronic Obstructive Pulmonary Disease : Effects beyond the Lungs)     208

⦿ Yes, some of them are relevant    204    ◎ No, none of them are relevant     206

Check all that apply – if checked use the text box below them to explain why it is related Microalbuminuria and hypoxemia in patients with chronic obstructive pulmonary disease. (2010 Oct 15 PubMed) Found using (Celli) AND ("stable patients") - Albert Einstein, Professor of Physics, Princeton University, albert.einstein@princeton.edu, 113 Market St. Princeton, NJ      218

| x | Relevant systemic effect |

Addressing the complexity of chronic obstructive pulmonary disease: from phenotypes and biomarkers to scale-free networks, systems biology, and P4 medicine. (2011 May 1 PubMed) Found using ("celli") AND ("Review obstructive pulmonary")- Oppenheimer, Professor of Physics,  212 oppenheimer@ucberkeley.edu, University of California, 145 Main Street, Berkeley      220

216    Directly Relevant

☐ Involvement of endothelial apoptosis underlying chronic obstructive pulmonary disease-like phenotype in adiponectin-null mice: implications of therapy. (2011 May 1 PubMed)Found ("link between COPD") AND ("systematic inflammation")-William Shockley, Professor of Physics, william.shockley@mit.edu, Massachusetts Institute of Technology, 444 El Camino Real, Cambridge , MA      210

| x | Comparison of biomarkers of subclinical lung injury in obstructive sleep apnea. (2010 Jul 11 PubMed)Found using ("lung-specific biomarker")-Albert Einstein, Professor of Physics, Princeton University, albert.einstein@princeton.edu, 113 Market St. Princeton, NJ      214

☐ The link between periodontal disease and cardiovascular disease: How far we have come in the last two decades? (2010 Jul 11 PubMed)Found using ("link between COPD") AND ("Review  222 obstructive pulmonary")-William Shockley, Professor of Physics, william.shockley@mit.edu, Massachusetts Institute of Technology, 444 El Camino Real, Cambridge , MA

FIGURE 2

Are any of the following updates to PubMed relevant to your paper? (i.e. Chronic Obstructive Pulmonary Disease : Effects beyond the Lungs)   202

● Yes, some of them are relevant           ◎ No, none of them are relevant 204    212    214    206

Check all that apply – if checked use the text box below them to explain why it is related

[X] Chronic obstructive pulmonary disease and lung cancer at the end of life (2010 May 22 PubMed)-Albert Einstein, Professor of Physics, Princeton University, albert.einstein@princeton.edu, 113 Market St. Princeton, NJ

218

Related topic 216    222

[ ] Experimental pulmonary infection and colonization of Hemophilic influenzae in emphysematous hamsters (2010 Aug PubMed) Oppenheimer, Professor of Physics, oppenheimer@ucberkeley.edu, University of California, 145 Main Street, Berkeley    210

220

312

[ ] Pulmonary hypertension related to pulmonary diseases or hypoxia and its treatment (2010 Sep PubMed)   Shockley, Professor of Physics, william.shockley@mit.edu, Massachusetts Institute of Technology, 444 El Camino Real, Cambridge , MA

[ ] Systemic diseases and the elderly. (2010 Sep PubMed)   Shockley, Professor of Physics, william.shockley@mit.edu, Massachusetts Institute of Technology, 444 El Camino Real, Cambridge , MA

[X] Chronic obstructive pulmonary disease and its comorbidities (July 2011, PubMed)Albert Einstein, Professor of Physics,Princeton University, albert.einstein@princeton.edu, 113 Market St. Princeton, NJ

IDENTIFICATION OF FILES OF A COLLABORATIVE FILE STORAGE SYSTEM HAVING RELEVANCE TO A FIRST FILE

RELATED APPLICATIONS

This patent application is a continuation of U.S. patent application Ser. No. 13/438,351, filed Apr. 3, 2012, which is herein incorporated by reference.

FIELD OF EMBODIMENTS

The described embodiments relate generally to search results. More particularly, the described embodiments relate to methods, and systems for identifying files of a collaborative file storage system or a desktop file storage system having relevance to a first file.

BACKGROUND

In a collaborative file storage system, search engines use a variety of search techniques to present documents to users based on one or more search terms, which are provided, by the users. The relevance of search results relate closely to the search terms. Selection of a document from the search results in the search engine of a collaborative file storage system provides a list of documents related to the selected document. Users who like to read more about the related subject matter use the results suggested by the author or the search engine itself. Many authors suggest related documents that are very valuable to users also referred to as citations. The suggested list however is older than the selected document. For documents published after the publication date of the selected document, users have to rely on the search engine to provide a relevant list. The documents suggested by search engines are based on the search engine's algorithm. The search engine generally produces a large number of documents, which include some irrelevant results and are difficult to sort for relevant documents. Many suggested documents are not relevant to the user. Relevant results are not always provided.

It is desirable to have methods and systems for providing an up-to-date list of documents (files) related to the selected document (file) relevant to the subject matter of the selected document in a collaborative file storage system or a desktop file storage system.

SUMMARY

One embodiment includes a method of identifying files of a file storage system having relevance to a first file. The method includes identifying a plurality of files within the file storage system, wherein the plurality of files each have a relationship with the first file, and wherein the file storage system allows sharing of the plurality of files between multiple users through a network. The method further includes generating, by a system server, a list of inquiries based on the plurality of files, providing, by the system server, the list of inquiries to at least one collaborator of the first file, receiving from the at least one collaborator at least one response to the list of inquiries, selecting a subset of the plurality of files based on the at least one response, and storing information related to the selected subset of the plurality of files for access if the first file is selected.

Other aspects and advantages of the described embodiments will become apparent from the following detailed description, taken in conjunction with the accompanying drawings, illustrating by way of example the principles of the described embodiments.

BRIEF DESCRIPTION OF DRAWINGS

In the following figures like reference numbers are used to refer to like elements. Although the following figures depict various examples, the one or more implementations are not limited to the examples depicted in the figures.

FIG. 2 shows an example list of inquiries presented to the collaborators.

FIG. 3 is another example list of inquiries presented to the collaborators.

DETAILED DESCRIPTION

The described embodiments are embodied in methods, and systems for providing a set of files to a user in a collaborative file storage system, where the set of files have relevance to the first file from a search or retrieval of a record identifying the first file.

Figure 1:
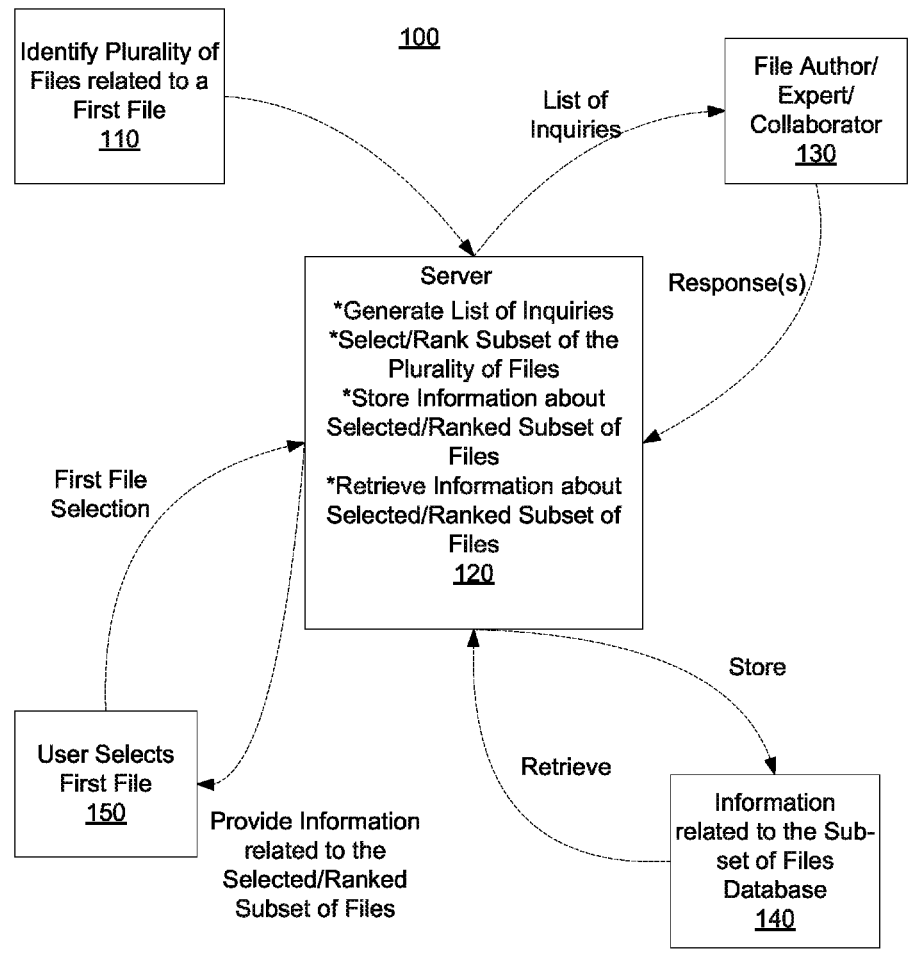
FIG. 1 is a block diagram of an embodiment of a system of providing related files from a collaborative file storage system, where a collaborator provides input to selecting/ranking a subset of files.

FIG. 1 is a block diagram of an embodiment of system 100, a system of providing related files from a collaborative file storage system, where a collaborator is involved in selecting/ranking a subset of files.

Enterprises create shared file systems for various business activities. A collaborative file storage system provides a platform for sharing files for teams of people working together. For at least one embodiment, the collaborative file storage system includes remote storage of a plurality of files, and allows sharing of the plurality of files between multiple users through a network. Users can upload files and share the files immediately without the need to email or transport using portable storage drives. In an embodiment, the shared files have read or read and write privileges. PubMed®, SharePoint®, Pike®, Google Doc®, Box.net®, Drop Box®, and desktop file systems such as Microsoft Window®, Apple Macintosh®, or Linux® are examples of collaborative file storage system. Collaborative file storage system is a file storage system among the members of an enterprise or group. The collaborative file storage system stores files of different formats not limited to word document, power point presentations, portable document format (pdf), and spreadsheets. In one embodiment of a collaborative file storage system, a user may contribute to the file system. In an embodiment, any user may edit a file similar to a wiki. In another embodiment, write privilege to a file may be assigned to a certain group of users such as team of authors or a team of people working on a project.

For at least one embodiment, the collaborative file storage system includes a desktop file storage system for storage of the plurality of files at a desktop or a mobile user computer, and allows sharing of the plurality of files between multiple users through a network. In an embodiment, the shared files have read or read and write privileges. Microsoft Window®, Apple Macintosh®, and Linux® are examples of personal computer operating systems that contain a desktop file storage system. Mendeley, Evernote, and Zotero are examples of desktop file storage systems that run in personal computer operating systems. A desktop file storage system is a file storage system running inside the operating system of a personal computer. The desktop file storage system stores files of different formats not limited to word document, power point presentations, portable document format (pdf), and spreadsheets. In one embodiment of a desktop file storage system, a user may contribute to the file system.

In several embodiments, a first file is a file in the collaborative file storage system, a file whose URL was shared by the user on a social network, or a file on the disk drive of the user system, or a file on the internet, or a file on any other file system identified to generate a list of related files. The first file may be a recently added file to the collaborative file storage system, or identified due a large number of files added to the collaborative file storage system in the same subject matter, or identified automatically for a periodic update of related files, or identified by any other method. It is to be understood that for various embodiments, the first file and the related files includes at least one of a web page, a document, an article, a social profile, a message, a message thread, a conversation, a video file, an audio file, or a picture file. It is also to be understood that this is not an exhaustive list.

At least some embodiments of the collaborative file storage system are updated constantly as users add files to the file storage system. As the number of files grows large, existence of the file may not be known to many users if relevant hyperlinks to other files are not created. Creating hyperlinks is a manual task and often few files are linked together in a collaborative file storage system. Search engines provide access to the files that are not linked. Examples of search engines for a desktop file storage system include X-1, Windows Search, and Apple Spotlight.

Many collaborator/authors list references or citations in their files. The files referenced by collaborators/authors are generally more relevant than the machine generated references, but have a publication date earlier than the current file. Unlike machine generated references using an algorithm running on a computer, the judgment of human authors in selecting reference documents is uniquely valuable to other readers due to the author's intrinsic understanding and motivation to identify materials related to the file written by that author. In general, an author or expert has greater interest and more precise understanding of the subject matter compared to other readers. In the described embodiments, a collaborator is an author or a co-author or an expert on the subject matter or a team member or a person who is identified for correspondence related to the first file or listed in the metadata of the first file anyone who has write-privilege to the first file.

Search engines list files that may be related to a first file that may be published before or after the first file has been published. When a file is selected from the search results, a set of possibly related files is generally presented by search engines. The list may not always be accurate. For example, when asked to evaluate the accuracy of the list of related files, an author of the first file or expert on the subject matter of the first file may not always concur with the relationship of all the files presented in the list of related files provided by the search engine. Therefore, lists of possibly related files produced by the search engines may contain some files that are actually related (true-positives) and some that are unrelated in practice (false-positives). The set of related files produced by a search engine are based on some criteria such as the number of hyperlinks a file has, common subject matter, and the frequency of certain phrases. The number of hyperlinks to a file is one of the criteria used by search engines to rank it in search results to make it visible to users searching for it. If a file has no hyperlinks, a file that is actually related may be missing from the list of related files presented by the search engine (false-negatives). The list of related files presented by a search engine can be improved by surveying an expert or author to recommend the related files and eliminate false-positives and false-negatives. The method of semi-automating the presentation of a list of related files using surveys is described in the embodiments.

For at least one embodiment, a set of files related to the first file is identified in collaborative file storage system 110 by server 120. In one embodiment, identifying in collaborative file storage system 110 includes server 120 identifying a set of files related to the first file and receiving the list of identified files. In another embodiment, identifying in collaborative file storage system 110 includes server 120 receiving the list of identified files. The set of identified files 110 can be the output of natural language search, or a text analysis, or from collaborative filtering, or any other search technique. The search can be based on a string of words, or a picture or a collaborator. The set of files is derived based on a relationship with the first file. The relationship can be any one of or some of author of the first file, author of the references cited in the first file, frequently used noun phrases, publication date later than the first file, a specific publication date, or a publication date after a specific date. Files published from an author tend to have common subject matter. Frequently used noun-phrases in the first file are also keywords for searching related files. However, noun phrases may change with technology or over a period. Many search engines may not have the intelligence to recognize the changing noun phrases over a period. In some embodiments, the full-text of the file is used for searching to yield more relevant related files. Files with publication date later than the first file are valuable as users are generally interested in recent updates. In an example, a search engine operating on server 120 uses Windows Search API to identify bibliography of post-publication updates to papers in the Microsoft Windows® desktop file storage system, based on noun phrases in full-text.

In an example, a search engine operating on server 120 uses ENTREZ® API to identify bibliography of post-publication updates to papers in PubMed®, based on noun phrases in full-text. PubMed® is a free database of references and abstracts on life sciences and biomedical topics. ENTREZ® is a powerful search engine that allows users to search health sciences database at the National Center for Biotechnology Information website. The algorithm used to generate the search terms using ENTREZ® API automatically extracts noun phrases from a file using natural language processing tools and ranks them by the number of occurrences in the file compared to the number of occurrences on the web. In another embodiment, a search API such as FAST/SharePoint®, Google Search Appliance®, or Autonomy IDOL® may be used. In another embodiment, a search API such to Windows Desktop Search® or Apple Macintosh Spotlight Search®, or X1® search may be used.

In an embodiment, citation-validation is used to generate the list of related documents 110. Citation-validation is defined as search results from queries where the queries are present in one or more citations provided by the author. Citation-validated search terms improve the relevance of the search results compared to search terms that are not present in the citations. The citations can written by the same authors as the paper or written by different authors.

For an embodiment, a server 120 generates a list of inquiries based on the set of files related to the first file. In an embodiment, the list of inquiries includes questions asking the collaborator whether the files are relevant to the first file, and the search terms used in keyword search or noun-phrase used to select the file.

FIG. 2 shows example 200, an inquiry generated using keyword search by desktop API in desktop file storage system or ENTREZ® API in PubMed®. The selection of keyword search results displays related files. Example 200 shows the related files from keyword searches. In example 200, 202 is the title of the first file. The first question summarizes the inquiry about relevant files. 204 is a check box next to a related file selected by a search engine. 206 is the publication date of the related file. 208 is the search term used to identify the related file. 210 is an input box for the collaborator to enter the reason for the file being relevant. 212 shows the author who selected the profile as relevant. 214 shows the institution of the author. 216 shows the relationship tag, 218 shows the email address of the author, 220 shows the address and 222 shows the affiliation of the author. In one embodiment, the identity of the senders who selected each message thread is revealed to the user by displaying meta-data such as the sender's name, address, or contact information.

FIG. 3 shows example 300 generated using PubMed® ENTREZ® API to obtain related citations in PubMed® and display the files published after the first file. In the described embodiments, a single ranked list of PubMed® papers that are related are derived from text-analysis of papers is referred to as PubMed® Related-Citations. For each word or term in each paper, a numeric weight is computed based on the number of times the word occurs in the paper and the number of papers that the term occurs in within PubMed®. The numeric-weight is used to find the most similar pairs of papers. 312 is the title of the document obtained from related citations. In another embodiment, Autonomy® or Google Search Appliance® indexes the collaborative files system and includes "automatic hyperlinks" or "related documents" functions similar to PubMed® "related citations."

For an embodiment, again referring to FIG. 1, a collaborator 130 is notified of the list of inquiries generated by server 120. In the described embodiments, the notification can be sent electronically. In an embodiment, the notification email contains a link to a webpage that contains the list of inquiries. In another embodiment, the email contains the text of the inquiries. In another embodiment, the notification is sent by an email or message on a social network such as Facebook® or instant message system. In another embodiment, the notification is sent from a web-based interface such as Jive®, or LinkedIn® or Google Docs®. The collaborator completes the inquiry by selecting one or more files related to the first file in the opinion of the collaborator, and sends the response to the server using any of the notification methods described above. Server 120 receives the response to the inquiry from the collaborator and processes the response. The response includes a selection of files related to the first file. In an embodiment, the response includes a ranked list of the related files, identifying the relevance of the related files to the first file.

In an embodiment, files selected by the collaborator are ranked higher than the files not selected by the collaborator. A subset of the ranked files is selected. In another embodiment, all files selected by the collaborator 130 are selected. In another embodiment, a certain number of ranked files are selected. Server 120 creates a hyperlink between the first file and the subset of selected/ranked files in the collaborative file storage system. The hyperlink influences future search results of the engine when the first file or any of the subset of files is involved. Server 120 stores information about the subset of related files in a storage system 140. The information includes one or more of hyperlinks to the related files, ranking of the files, the collaborator of the first file, and metadata of the files. In the described embodiments, hyperlinks are references to files that connect the users to another file or a portion of the file. In another embodiment, storage system 140 is a separate file storage system. When a user selects the file identifier (150) from search results or any other listing, server 120 retrieves information about the selected/ranked related files. In several embodiments, the user is presented with a list of information about the related files shown in FIG. 2 and FIG. 3. In one embodiment, the identity of the collaborators who selected each file is revealed to the user by displaying meta-data such as the collaborator's name, institution, and qualifications.

Figure 4:
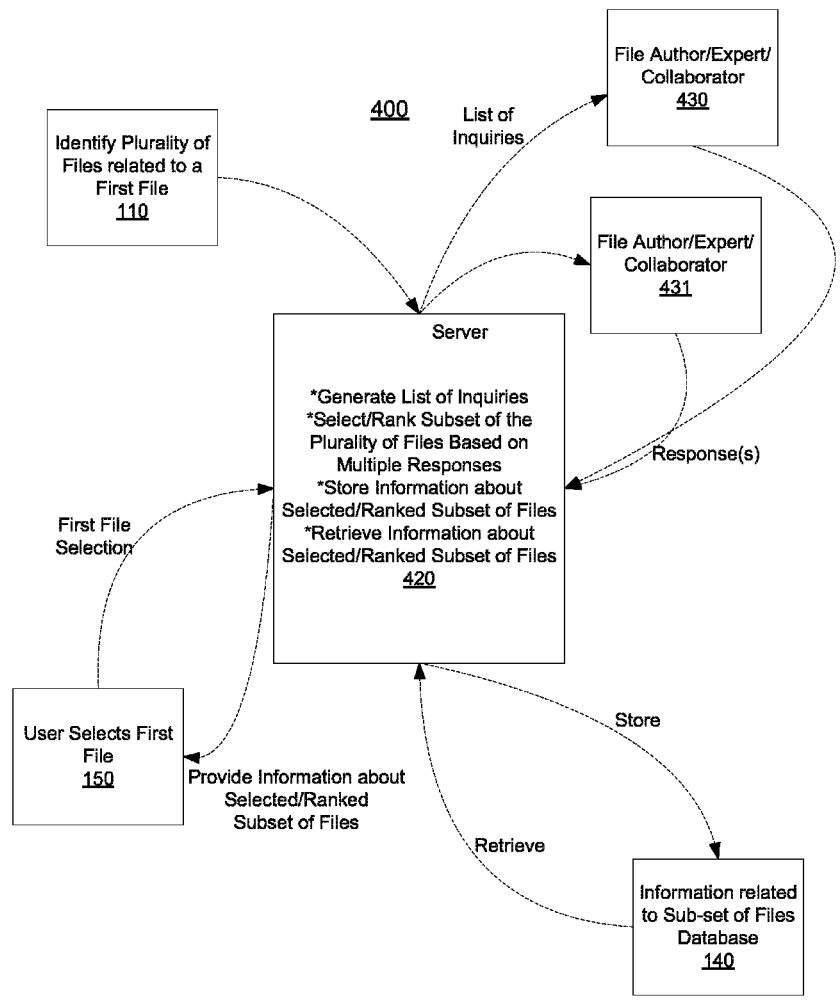
FIG. 4 is a block diagram of an embodiment of a system of providing related files, where more than one collaborator provides input to selecting/ranking a subset of files.

FIG. 4 is a block diagram of an embodiment of system 400, a system of providing related files, where more than one collaborator provides input to selecting/ranking a subset of files. A set of files related to the first file 110 is identified in collaborative file storage system by server 420. For at least some embodiments, the set of files is derived based on a relationship such as author, frequently use noun-phrases, and common subject matter with the first file. For an embodiment, a server 420 generates a list of inquiries based on the set of files related to the first file. In an embodiment, the list of inquiries includes questions asking the collaborators whether the related files are relevant to the first file as determined by the search engine.

For at least one embodiment, the list of inquiries generated by server 420 is notified to the first collaborator 430. In at least some of the described embodiments, a first collaborator is the author of the first file, an expert on the subject matter or a team member or anyone who has write-privilege to the first file. The list of inquiries is also notified to second collaborators 431. In at least some of the described embodiments, the second collaborator is one or more collaborators other than the first collaborator. The first and second collaborators are notified electronically as described in conjunction with FIG. 1. Server 420 receives responses from the first collaborator as well as the second collaborators. The response includes a selection of files related to the first file. In an embodiment, the response includes a ranked list of the related files, identifying the relevance of the related files to the first file. In an embodiment, files are ranked based on the number of selections from the first and the second collaborators. In an embodiment, the files selected by the first collaborator are ranked higher than the files selected by second collaborators. In another embodiment, all responses are ranked with the same weight. In another embodiment, a certain number of ranked files are selected. In another embodiment, all files selected by the first collaborator and the second collaborators are selected.

For at least some embodiments, information about the selected/ranked files is stored in a storage system 140. User selection of the first file identifier 150 from search results or any other listing is sent to server 420. In several embodiments, server 420 retrieves information about the selected/ranked list of related files from the file storage system before presenting to the user shown in FIG. 2 and FIG. 3. In one embodiment, the identity of the collaborators who selected each file is revealed to the user by displaying meta-data such as the collaborator's name, institution, and qualifications.

Figure 5:
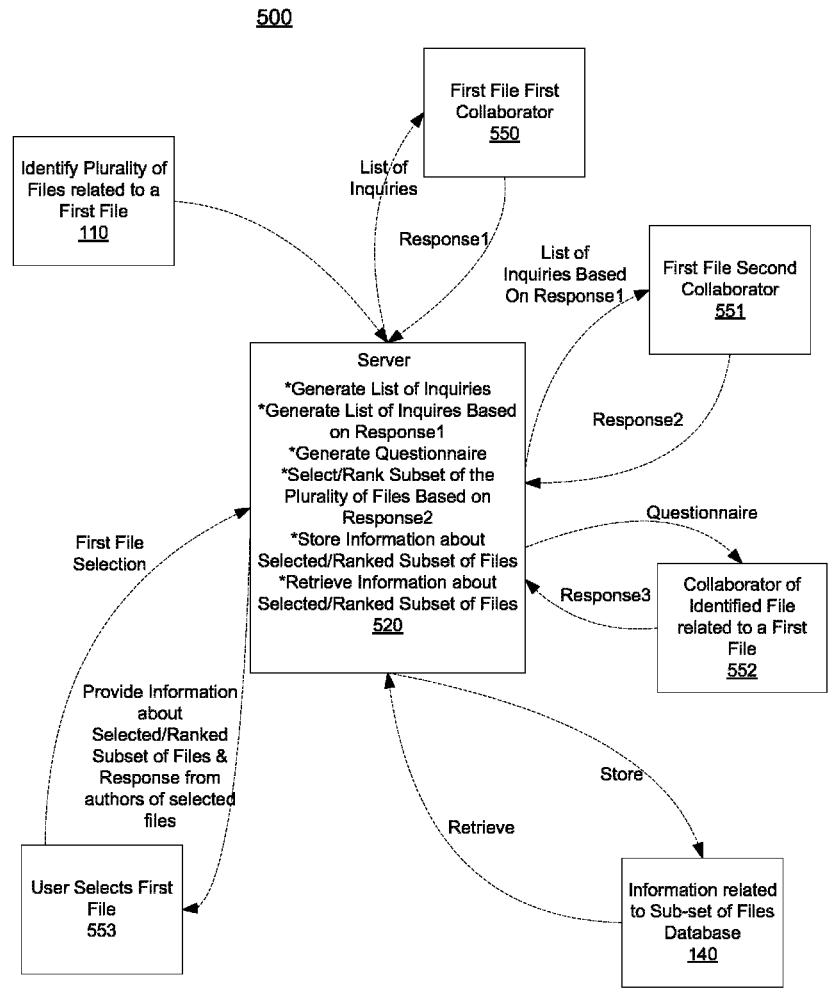
FIG. 5 is a block diagram of an embodiment of a system of providing related files in a collaborative file storage system, where more than one collaborator is involved in the selecting/ranking a subset of files and more than one list of inquiries is generated.

FIG. 5 is a block diagram of an embodiment of system 500, a system of providing related files, where more than one collaborator provides input to selecting/ranking a subset of files and more than one list of inquiries is generated. For this embodiment, one or more files related to a first file are identified by server 520 in a collaborative file storage system (similar to the description in conjunction with FIG. 1). A list of inquiries is generated by server 520 based on the files related to the first file. The list of inquiries includes questions asking the relevance of the related file to the first file. The list of inquiries is notified to a first collaborator 550. A first response is received from first collaborator 550 by server 520. The first response includes selection of files that are related to the first file in the opinion of the first collaborator 550. In an embodiment, the first response includes a ranked list of the related files, identifying the relevance of the related files to the first file. A second list of inquiries is generated based on the first response. The second list of inquiries includes questions about the selection of the files related to the first file by the first collaborator. In an embodiment, the second list of inquiries includes one or more of the selection of related files by the first collaborator, the publication date, the abstract, the unique identification number, the search terms used to identify the related file or the noun-phrases used to identify the files, or the noun-phrases in the citation of the first file.

For at least some embodiments, second collaborators 551 are notified electronically (by methods discussed in conjunction with FIG. 1) with the second list of inquiries. Server 520 receives the second response from second collaborators 551 and analyzes the second response. The second response further refines the machine generated search results. The second response includes a selection of files related to the first file. In an embodiment, the second response includes a ranked list of the related files, identifying the relevance of the related files to the first file.

In an embodiment, server 520 generates a questionnaire based on identified files related to the first file 110. The questionnaire includes the opinion of the collaborator of the identified file about the selection as a related file to the first file. The questionnaire is notified to the collaborators of identified files 552. Server 520 receives response3 from the collaborators of identified file 552. In an embodiment, server 520 ranks an identified file based on the number of selections from second collaborators 551 and the selection from the collaborator of identified file 552. A subset of the ranked related files is selected. In an embodiment, all files selected by second collaborators are selected. In another embodiment, related files receiving a certain rank are selected. Information related to the selected/ranked files is stored in storage system 140. In an embodiment, the information related to the selected/ranked file includes one or more of hyper-link to the selected file, the collaborator of the selected file, the title of the selected file, the collaborators, the opinion of the collaborator of the selected file, opinion of the collaborators of the first file, institution of the collaborator, the published date, and the selection/rank date. When a user selects the first file identifier 553, server 520 retrieves the information related to the selected related files from storage system 140. In several embodiments, information related to the subset of selected/ranked files is presented to the user shown in FIG. 2 and FIG. 3. In one embodiment, the identity of the collaborators who selected each file is presented to the user by displaying meta-data such as the collaborator's name, institution, and qualifications. In another embodiment, information about the opinion of the collaborator of the selected file is presented to the user.

Figure 6:
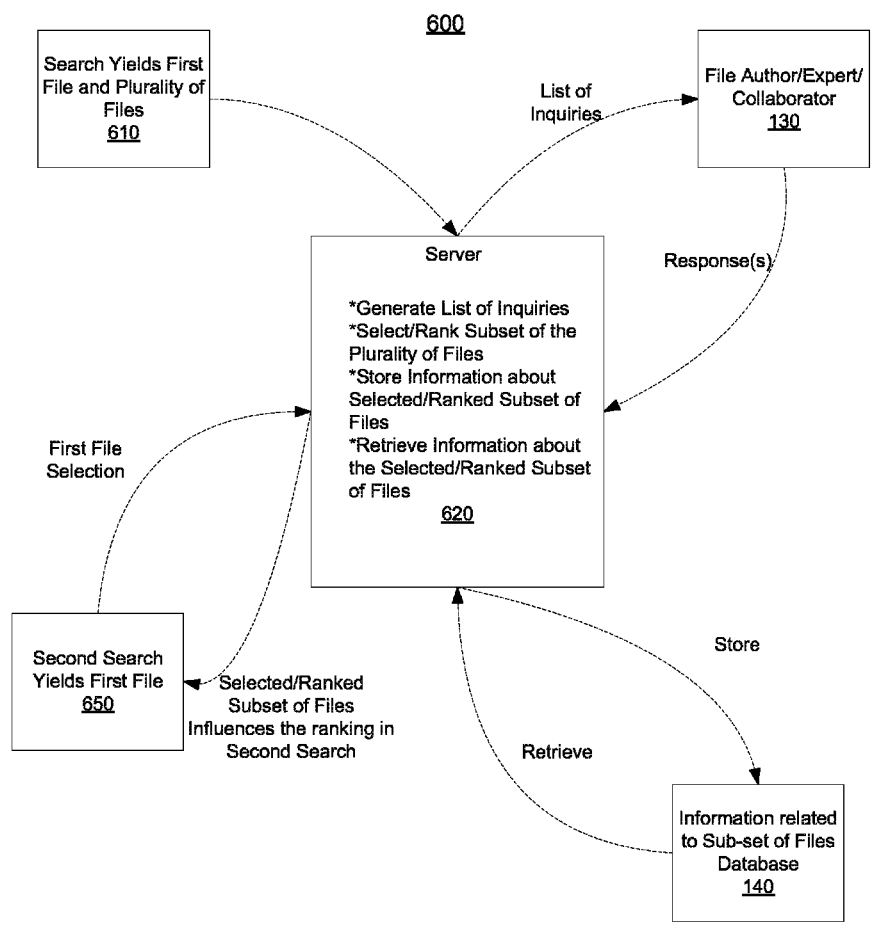
FIG. 6 is a block diagram of an embodiment of a system of providing related files, where a collaborator provides input to selecting/ranking a subset of files, where a search yields a first file.

FIG. 6 is a block diagram of system 600, an embodiment of a system of providing related files, where a collaborator is involved in the selecting/ranking a subset of files, where a search yields a first file. Server 620 searches for a first file in the collaborative file storage system of the enterprise. The search engine outputs a list of files 610 related to the first file based on search techniques described in conjunction with FIG. 1. Server 620 generates a list of inquiries based on the list of related files. The list of inquiries includes questions whether each of the files from search results are relevant to the first file.

The list of inquiries is notified to the collaborator of the file 130. A response is received from the collaborator. The response includes a selection of files related to the first file and optionally the reason for relevancy in the collaborator's opinion. In an embodiment, the response includes a ranked list of the related files, identifying the relevance of the related files to the first file. Server 620 ranks the related files based on the response from the collaborator. A subset of the ranked related files is selected. Server 620 stores information about the subset of selected/ranked files in a storage system 140. When a second search yields a plurality of search results containing the information identifying first file 650, server 620, retrieves the stored information about the subset of selected/ranked files and influences the ranking of the first file relative the search results when presenting the search results to the user. In one embodiment, the identity of the collaborators who selected each file is revealed to the user by displaying meta-data such as the collaborator's name, institution, and qualifications.

Methods

Figure 7:
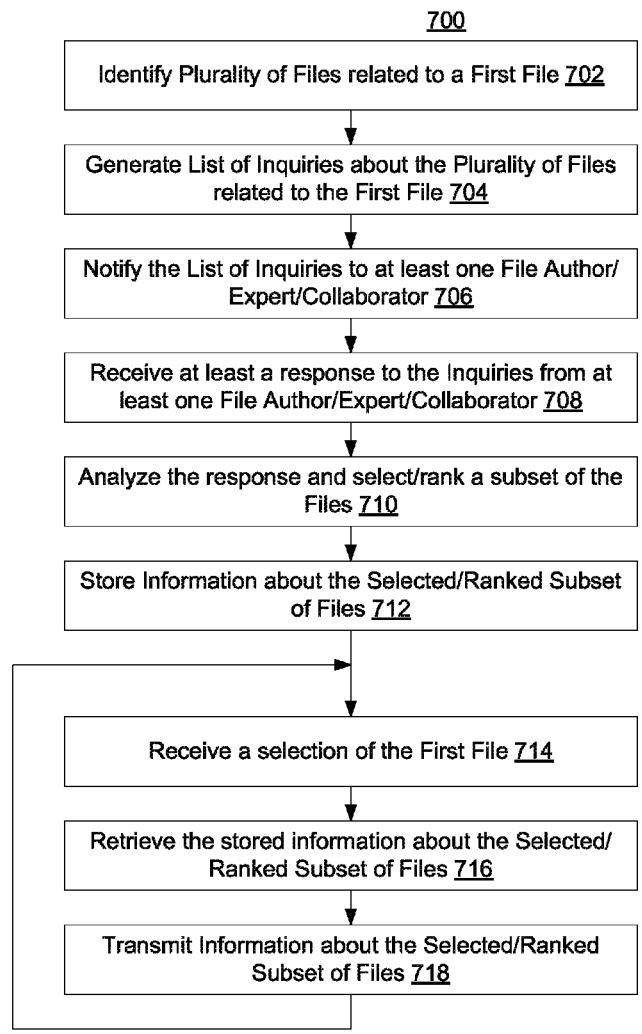
FIG. 7 is a flowchart that includes the steps of an example of a method of providing related files in a collaborative file storage system, where one or more collaborators provide input to selecting/ranking a subset of files.

FIG. 7 is a flowchart that includes the steps of an example of a method of providing related files, where a collaborator is involved in the selecting/ranking a subset of files. In step 702, the collaborative file storage system is searched to identify one or more files that are related to a first file. For at least some embodiments, the search is based on any of or all of natural language search, machine language search, text analysis, or collaborative filtering. For at least some embodiments, the collaborative file storage system is searched for keywords that are automatically generated by the server. The keywords may be the author/authors of the first file, frequently appearing words, authors of cited references in the first file, noun phrases based on subject matter, and title. In an embodiment, the search is conducted on the full-text of the file. In another embodiment, only the abstract and the title are searched. In an embodiment, only files published after the first file's published date are searched. In embodiment, the algorithm used to generate the search terms using ENTREZ® API automatically extracts noun phrases from the first file using natural language processing tools and ranks them by the number of occurrences in the file compared to the number of occurrences on the web. In one embodiment, the algorithm used to generate the search terms using desktop search API automatically extracts noun phrases from the first file using natural language processing tools and ranks them by the number of occurrences in the file compared to the number of occurrences on the desktop file storage system. In an embodiment, citation-validation is used to generate the list of related files to improve the quality and relevance of the search results.

In step 704, the server automatically generates a list of inquires based on the search results of step 702 to access the relevancy of the search result. The list of inquiries includes questions about each related file. In an embodiment, inquiries list the title of one or more files identified in the search, the publication date, and the search terms used to identify the file. Other embodiments may not list all the above items. FIG. 2 and FIG. 3, show an example of the list of inquiries presented to collaborators. In step 706, the list of inquiries is notified to at least one collaborator of the first file. In the described embodiments, the notification can be sent electronically by an email, or a message on a social network or instant message. Web based interface is another method of notifying the collaborator.

In step 708, method 700 receives at least one response to the list of inquiries from the collaborators. The response includes a selection whether any of the files are relevant to the first file. If any of the files are relevant, a selection of the relevant file and optionally the reason for the file being relevant is received by the server. In an embodiment, the response includes a list of the related files, identifying the relevance of the related files to the first file. In step 710, method 700 analyzes the responses from the collaborators. The related files are ranked based on the number of selections received from the collaborators. A subset of the ranked related files is selected. In an embodiment, all files selected by the collaborators are selected. In another embodiment, a certain number of ranked files are selected. In another embodiment, files receiving certain rank are selected. Method 700 creates a hyperlink between the first file and the selected/ranked subset of files. The hyperlink can influence the search results in the collaborative file storage system when the first file is involved. In step 712, information about the selected/ranked files related to the first file is stored. The information about the selected/ranked files includes at least one of hyperlinks to the files in the collaborative file storage system, the rank of each file in the selected subset, metadata of the files. The information may be stored on the collaborative file storage system or any other storage system.

Steps 702-712 are performed to generate a list of selected/ranked files that may be more relevant than the machine generated references. In an embodiment, steps 702-712 are performed once. In another embodiment, steps 702-712 are performed at certain fixed intervals. In another embodiment, events such as addition of a certain number of files or a manual intervention may trigger steps 702-712.

In step 714, method 700 receives a selection of the first file identifier or information about the first file from a user. The file or information about the file may be selected from search results or from a list of files. The server retrieves the stored information about the selected/ranked files in step 716. In several embodiments, information about the related files is displayed to the user in step 718 shown in FIG. 2 and FIG. 3. In one embodiment, the identity of the collaborators who selected each file is revealed to the user by displaying metadata such as the collaborator's name, institution, and qualifications. Steps 714-718 are performed when a user selects the first file for display.

In an embodiment, each of the steps of method 700 may be a distinct step. In other embodiments, method 700 may not have all of the above steps and/or may have other steps in addition to or instead of those listed above. The steps of method 700 may be performed in another order. Subsets of the steps listed above as part of method 700 may be used to form their own method. In an embodiment, there could be multiple instances of method 700.

Figure 8:
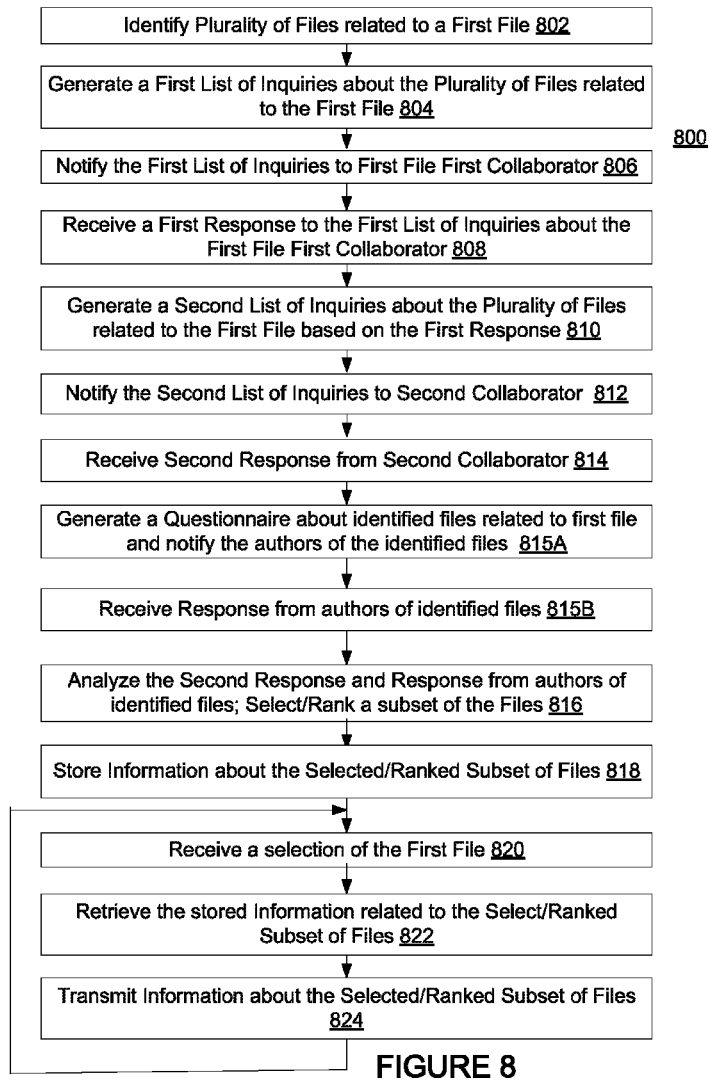
FIG. 8 is a flowchart that includes the steps of an example of a method of providing related files in a network, where more than one list of inquiries is generated and more than one collaborator is involved in the selecting/ranking a subset of files.

FIG. 8 is a flowchart that includes the steps of an example of a method 800 of providing a list of related files, where more than one list of inquiries is generated and more than one collaborator is involved in the selecting/ranking a subset of files. In this method, at least two distinct lists of inquiries are generated, the first list of inquiries is sent to the first collaborator and the second list of inquiries is sent to the other collaborators. The second list of inquiries is generated based on the response from the first collaborator.

In method 800, a set of one or more files related to a first file is identified in step 802. In step 804, a first list of inquiries about the set of files identified in step 802 is generated. The first list of inquires includes questions whether each of the identified files are related to the first file and optionally why they are related. In the described embodiment, steps 802 and 804 are similar to steps 702 and 704 respectively. The first list of inquiries is notified to a first collaborator of the first file in step 806. A first response to the first list of inquiries is received in step 808. The response includes a selection of files related to the first file and optionally the reason for the selection. In step 810, a second list of inquires based on the response from the first collaborator about the relevance of the set of files to the first files is generated. In an embodiment, the second list of inquiries includes a list of files selected by the first collaborator for selecting files related to the first file. In an embodiment, the second list of inquires includes questions whether the second collaborator agrees with the first collaborator. In another embodiment, the second list of inquiries includes the reason for a file being relevant to the first file.

One or more second collaborators of the first file are notified with the second list of inquiries in step 812. In step 814, one or more second response is received from the second collaborators 551. In an embodiment, a questionnaire is generated based on the list of identified files in step 815A. The questionnaire includes whether the identified file is related to the first file. The questionnaire is notified to one or more authors of the plurality of identified files. In step 815B, server 520 receives response from one or more authors of the plurality of identified files.

In step 816, the second response from the second collaborators in analyzed. In an embodiment, the response from one or more authors of the plurality of identified files is analyzed. In an embodiment, files are ranked based on the number of selections from the second collaborators. In another embodiment, files are ranked based on the response from authors of identified files in addition to the response from second collaborators. In an embodiment, the response includes identifying the relevance of the related files to the first file. In an embodiment, files are ranked based on the number of selections from the second collaborators. In another embodiment, the ranking of a file is also based on the opinion of the author of the identified file. A subset of the ranked files is selected. In an embodiment, all files selected by the second collaborators are selected. In another embodiment, a certain number of ranked files or files with a certain rank are selected. Method 800 creates a hyperlink between the first file and the selected/ranked subset of files. The hyperlink can influence the search results in the collaborative file storage system when the first file is involved. In step 818, information related to the selected/ranked subset of files related to the first file is stored in a file storage system. The information includes one or more of hyperlink to the selected file, opinion of the collaborators, opinion of the authors of the selected file, the institution of the collaborators, the ranking of the selected file, and the date of ranking Steps 802-818 are performed to generate a list of selected/ranked files that may be more relevant than the machine generated references. In an embodiment, steps 802-818 are performed once. In another embodiment, steps 802-818 are performed at certain fixed intervals. In another embodiment, events such as addition of a certain number of files or a manual intervention may trigger steps 802-818.

In step 820, the server receives a selection of the first file identifier. Information about the related files of the first file stored in a file storage system is retrieved in step 822. Information related to the selected/ranked files related to the first file is presented to the user in step 824. Steps 820-824 are performed when a user selects the first file for display. Steps 818, 820, 822, and 824 are similar to steps 712, 714, 716, and 718 respectively. In an embodiment, each of the steps of method 800 may be a distinct step. In other embodiments, method 800 may not have all of the above steps and/or may have other steps in addition to or instead of those listed above. The steps of method 800 may be performed in another order. Subsets of the steps listed above as part of method 800 may be used to form their own method. In an embodiment, there could be multiple instances of method 800.

Figure 9:
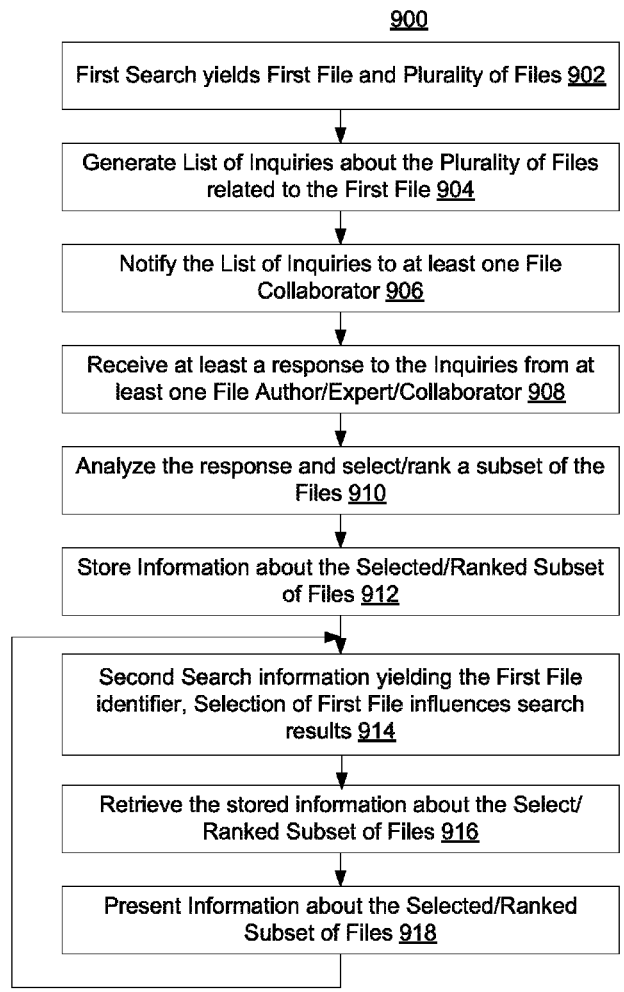
FIG. 9 is a flowchart of an example of a method of providing a list of related files, where a collaborator is involved in the selecting/ranking a subset of files, where a search yields a first file.

FIG. 9 is a flowchart that includes the steps of an example of method 900 of providing a list of related files, where a collaborator provides input to selecting/ranking a subset of files, and a search yields a first file. A first search in the collaborative file storage system using a search engine provides a list of files related to the first file in step 902. In embodiment, the algorithm used to generate the search terms using ENTREZ® API automatically extracts noun phrases from the first file using natural language processing tools and ranking them by the number of occurrences in the file compared to the number of occurrences on the web. In an embodiment, citation-validation is used to generate the list of related files.

For at least some embodiments, a list of inquiries is generated based on the files related to the first file in step 904. The list of inquiries includes whether each file listed as related file from the search results is related to the first file and optionally the reason for being related.

In step 906, the list of inquiries is notified to one or more collaborators. In step 908, method 900, receives at least one response from the collaborators providing information about the relevancy of related files to the first file and optionally the reason for a file being related in the opinion of the collaborator. In step 910, the related files are ranked based on the number of selections from the collaborators. In an embodiment, the response includes a ranked list of the related files, identifying the relevance of the related files to the first file. A subset of the ranked files is selected. Information related to the subset of files is stored in a file storage system in step 912. Method 900 creates a hyperlink between the first file and the selected/ranked subset of files. The hyperlink can influence the search results in the collaborative file storage system when the first file is involved. Steps 904, 906, 908, 910, and 912 may be similar to steps 704, 706, 708, 710 and 712. Steps 902-912 are performed to generate a list of selected/ranked files that may be more relevant than the machine generated references. In an embodiment, steps 902-912 are performed once. In another embodiment, steps 902-912 are performed at certain fixed intervals. In another embodiment, events such as addition of a certain number of files or a manual intervention may trigger steps 902-912.

A second search in the collaborative file storage system using a search engine yields a first file and the server receives a selection of the first file identifier in step 914. The selection of the first file can influence the search results of future searches. The server retrieves information about the related files (stored in step 912) from the file storage system in step 916. In several embodiments, in step 918, information about the related files is presented to the user shown in FIG. 2 and FIG. 3. In one embodiment, the identity of the collaborators who selected each file is revealed to the user by displaying meta-data such as the collaborator's name, institution, and qualifications. Steps 914, 916, and 918 may be similar to steps 714, 716 and 718. Steps 914, 916, and 918 are repeated for every search yielding the first file. In an embodiment, each of the steps of method 900 may be a distinct step. In other embodiments, method 900 may not have all of the above steps and/or may have other steps in addition to or instead of those listed above. The steps of method 900 may be performed in another order. Subsets of the steps listed above as part of method 900 may be used to form their own method. In an embodiment, there could be multiple instances of method 900.

Identifying Related Files

One or more files related to a first file in the collaborative file storage system are identified by server 120 or server 420 or server 520. In an embodiment, the collaborative file storage system includes a desktop file storage system. In the described embodiments, the first file can reside in a collaborator system 1022, or in the collaborative file storage system 1020 or in server system 1002. The related files are identified by natural language search, or a text analysis, or from collaborative filtering, or any other search techniques. In an embodiment, server 120 or 420 or 520 extracts from noun phrases from files in the collaborative file storage system using natural language processing tools and ranks them by the number of occurrences in the file compared to the number of occurrences on the web. In an embodiment, the search terms are in the text of the citations in the first file. In another embodiment, the search terms are in the abstract or the full-text of the files in the collaborative file system. In one embodiment, server 620 searches the collaborative file storage system uses ENTREZ® API to automatically extract noun phrases from files using natural language processing tools and rank them by the number of occurrences in the file compared to the number of occurrences on the web. In an embodiment, citation-validation is used to generate the list of related files.

In another embodiment, the PubMed "related citations" method is used to identify the files or papers published after the first file in a collaborative file storage system called PubMed. On PubMed, related citations are derived from text-analysis of files, and a ranked list of files that may be related is presented to the user. For each word or term in each file, a numeric weight is computed based on the number of times the word occurs in the file and the number of files the term occurs in within the collaborative file storage system. The numeric-weight is used to find the most similar pairs of papers or files. For any paper or file on PubMed, related citations may be obtained using the ENTREZ® API as soon as the paper is available on PubMed. For any paper or file on the desktop file system, related citations may be obtained using the desktop search API as soon as the paper is available on the desktop system.

Generation of List of Inquiries

In an embodiment, the list of inquiries generated by the system server includes one or more identified files related to a first file. In an embodiment, the inquiries include the search terms used in a search using text analysis or collaborative filtering. In another embodiment, the list of inquires includes one or more identified files and the noun-phrases from the first file used to identify the files. In an embodiment, the list of inquiries presented to the first collaborator includes one or more titles of related of files, the search term used to identify the related files, the noun-phrases in the citations of the first file, the publication date, the abstract, and the unique identification. The list of inquiries to second collaborators is influenced by a response received from a first collaborator. The list of inquiries to the second collaborators includes one or more of the selection of related files by the first collaborator, the search terms used to identify the related file, the noun-phases used in citation-validation techniques, the abstract, the unique identification number and the publication date. In an embodiment, the list of inquiries includes one or more of the types of relationship tags of the identified file such as whether the identified file summarizes the first file, contradicts the first file, or complements the first file.

The list of inquires is notified electronically to one or more second collaborators. The method of notification of the list of inquiries to the first collaborator and the second collaborators comprises at least one of an email, messaging on a social network, instant message or a web-based interface notification.

In an embodiment, a questionnaire is generated by the system server includes one or more identified files related to a first file. In an embodiment, the questionnaire includes whether the identified file is related to the first file. The questionnaire is notified to the collaborator of the identified file. The method of notification of the questionnaire to the collaborator of the identified file comprises at least one of an email, messaging on a social network, instant message or a web-based interface notification.

Selection and Ranking of Related Files

The related files are ranked based on the number of selections from the collaborators. In an embodiment, a selection of the related file from each collaborator is ranked equally. In another embodiment, selection of a file from the first collaborator receives higher ranking. In another embodiment, the selection of a file from a collaborator who responds to queries more often is ranked higher. In another embodiment, selection by the author designated for correspondence receives higher ranking. In an embodiment, all files selected by the collaborators are selected. In another embodiment, a certain number of the ranked files are selected. In another embodiment, files receiving a certain rank are selected.

An embodiment of a method of identifying files of a file storage system having relevance to a first file, comprising identifying a plurality of files within the file storage system, wherein the plurality of files each have a relationship with the first file; generating, by a system server, a list of inquiries based on the plurality of files; providing, by the system server, the list of inquiries to at least one collaborator of the first file; receiving from the at least one collaborator at least one response to the list of inquiries; selecting a subset of the plurality of files based on the at least one response; and storing information related to the selected subset of the plurality of files for access if the first file is selected. For an embodiment of the method, the file storage system includes a collaborative file storage system. For another embodiment of the method, the file storage system includes a desktop file storage system.

An embodiment of a method wherein the at least one collaborator comprises at least one author of the first file. An embodiment of a method further comprising generating, by the system server, a second list of inquiries based on the plurality of files; providing, by the system server, the second list of inquiries to at least one second collaborator of the plurality of files; receiving from the at least one second collaborator of the plurality of files at least one second response to the second list of inquiries; re-selecting the subset of the plurality of files based on the at least one response and the at least one second response; storing information related to the re-selected subset of the plurality of files for access if the first file is selected. An embodiment of a method further comprising providing, by the system server, the selected subset of the plurality of files to a user that selects the first file and identifying the at least one collaborator to the user.

An embodiment of a method wherein identifying the at least one collaborator comprises providing the user with the at least one collaborator's name, qualifications or institution. An embodiment of a method further comprising providing, by the system server, the selected subset of the plurality of files to a user that selects the first file and identifying the at least one collaborator of the first file, and the at least one collaborator of the plurality of files to the user, wherein identifying the at least one collaborator comprises providing the user with the at one of a name, qualifications or institution of the at least one collaborator. An embodiment of a method further comprising providing a hyperlink between the first file and the selected subset of the plurality of files, wherein the hyperlink influences a ranking of search results that include at least one of the first file and the plurality of files. An embodiment of a method wherein the plurality of files are each identified by a plurality of subject-matter searches, wherein each search identifies one of the plurality of files and the first file. An embodiment of a method wherein at least one of the plurality of subject-matter searches is refined by the at least one response.

An embodiment of a method wherein at least one of the plurality of subject-matter searches uses a keyword search application programming interface to access records in a file storage system. An embodiment of a method wherein the list of inquiries includes search terms used in a search that identified the first file and the plurality of files, thereby establishing a relationship between the first file and the plurality of files by text analysis or collaborative filtering. An embodiment of a method wherein the search terms comprise strings of words. An embodiment of a method wherein the search terms comprise noun phrases. An embodiment of a method wherein the search terms comprise collaborator names cited by the first file. An embodiment of a method wherein the search terms comprise a term within the first file.

An embodiment of a method the search is based on at least one of a word string, a collaborator, or an image. An embodiment of a method wherein the search terms are included within text of citations of the first file. An embodiment of a method wherein each of the plurality of files include a publication date, wherein each of the publication dates are more recent than at least one of a first revision or a last revision date of the first file. An embodiment of a method wherein each of the plurality of files includes a publication date, wherein each of the publication dates comprises a specific date. An embodiment of a method wherein each of the plurality of files includes a publication date, wherein each of the publication dates comprises a date before a specific date. An embodiment of a method wherein the list of inquiries includes titles of at least a subset of the plurality of files. An embodiment of a method wherein the list of inquiries includes collaborators of at least a subset of the plurality of files. An embodiment of a method wherein the at least one collaborator includes a first collaborator and a second collaborator, and wherein the list of inquiries for the first collaborator is influenced by a response received from the second collaborator. An embodiment of a method wherein the list of inquiries includes a relationship tag between at least one of the plurality of files and the first file. An embodiment of a method where in the relationship tag comprises at least one question of whether the relationship of the at least one of the plurality of files is supportive, contradictory or summarizing. An embodiment of a method wherein providing the list of inquiries to the at least one collaborator of the first file comprises electronically communicating the list of inquires to the at least one collaborator using a notification. An embodiment of a method wherein the notification comprises at least one of an email, messaging on a social network, or instant message. An embodiment of a method wherein the notification comprises a web-based interface notification.

An embodiment of a method wherein receiving from the at least one collaborator at least one response to the list of inquiries comprises receiving a selected subset of the plurality of files that the at least one collaborator selects as being relevant to the first file. An embodiment of a method wherein receiving from the at least one collaborator at least one response to the list of inquiries comprises receiving a ranked list of at least a subset of the plurality of files that identifies an order of relevance of the at least the subset of the plurality of files to the first file. An embodiment of a method further comprising providing the at least one inquiry based on one response to at least one other collaborator; receiving from the at least one other collaborator at least one second response to the at least one response; re-selecting the subset of the plurality of files based on the at least one second response; storing information related to the re-selected subset of the plurality of files for access if the first file is selected.

An embodiment of a method wherein the list of inquiries is provided to a plurality of collaborators, and responses received from each of the plurality of collaborators are compiled for selecting the subset of the plurality of files. An embodiment of a method wherein a plurality of lists of inquiries are provided to a plurality of collaborators, and responses received from each of the plurality of collaborators are compiled for selecting the subset of the plurality of files. An embodiment of a method further comprising the at least one collaborator having a permission to edit the first file. An embodiment of a method for a server to identify files having relevance to a first file, comprising receiving, by the server, a plurality of files, wherein the plurality of files were generated by a subject matter search; generating, by the server, a list of inquiries based on the plurality of files; providing, by the server, the list of inquiries to a collaborator of the first file, wherein the first file is a one of the plurality of files; receiving, by the server, from the collaborator at least one response to the list of inquiries; selecting, by the server, a subset of the plurality of files based on the at least one response; storing, by the server, the selected subset of the plurality of files for access if the first file is selected. An embodiment of a method further comprising providing, by the server, the selected subset of the plurality of files to a user that selects the first file.

An embodiment of a system for identifying files having relevance to a first file, comprising a server configured to present on a first display a list of inquiries to an identified collaborator of a first file, wherein the list of inquiries is based on a plurality of files; the server configured to receive from the identified collaborator at least one response to the list of inquiries; the server configured to select a subset of the plurality of files based on the at least one response; a server configured to present on a second display the selected subset of the plurality of files to a user that selects the first file.

An embodiment of a programmable storage device readable by a machine, tangibly embodying a program of instructions when executed by the machine to perform a method of identifying files of a collaborative file storage system having relevance to a first file, the method comprising: identifying a plurality of files within the collaborative file storage system, wherein the plurality of files each have a relationship with the first file; generating, by a system server, a list of inquiries based on the plurality of files; providing, by the system server, the list of inquiries to at least one collaborator of the first file; receiving from the at least one collaborator at least one response to the list of inquiries; selecting a subset of the plurality of files based on the at least one response; storing information related to the selected subset of the plurality of files for access if the first file is selected.

An embodiment of a method of identifying files of a collaborative file storage system having relevance to a first file, comprising: identifying a plurality of files within the collaborative file storage system, wherein the plurality of files each have a relationship with the first file; generating, by a system server, a first list of inquiries based on the plurality of files; providing, by the system server, the first list of inquiries to at least one collaborator of the first file; receiving from the at least one collaborator of the plurality of files at least one first response to the first list of inquiries; generating, by the system server, a second list of inquiries based on the plurality of files; providing, by the system server, the second list of inquiries to at least one second collaborator of the plurality of files; receiving from the at least one second collaborator of the plurality of files at least one second response to the second list of inquiries; selecting a subset of the plurality of files based on the at least one first response and the at least one second response; storing information related to the selected subset of the plurality of files for access if the first file is selected. An embodiment of a method wherein the at least one collaborator comprises at least one author of one of the plurality of files. An embodiment of a method wherein the information related to the selected subset of the plurality of files comprises an opinion of the at least one collaborator of either the first file or the plurality of files. An embodiment of a method further comprises providing the opinion of the at least one collaborator to a user that selects the first file.

System

Figure 10:
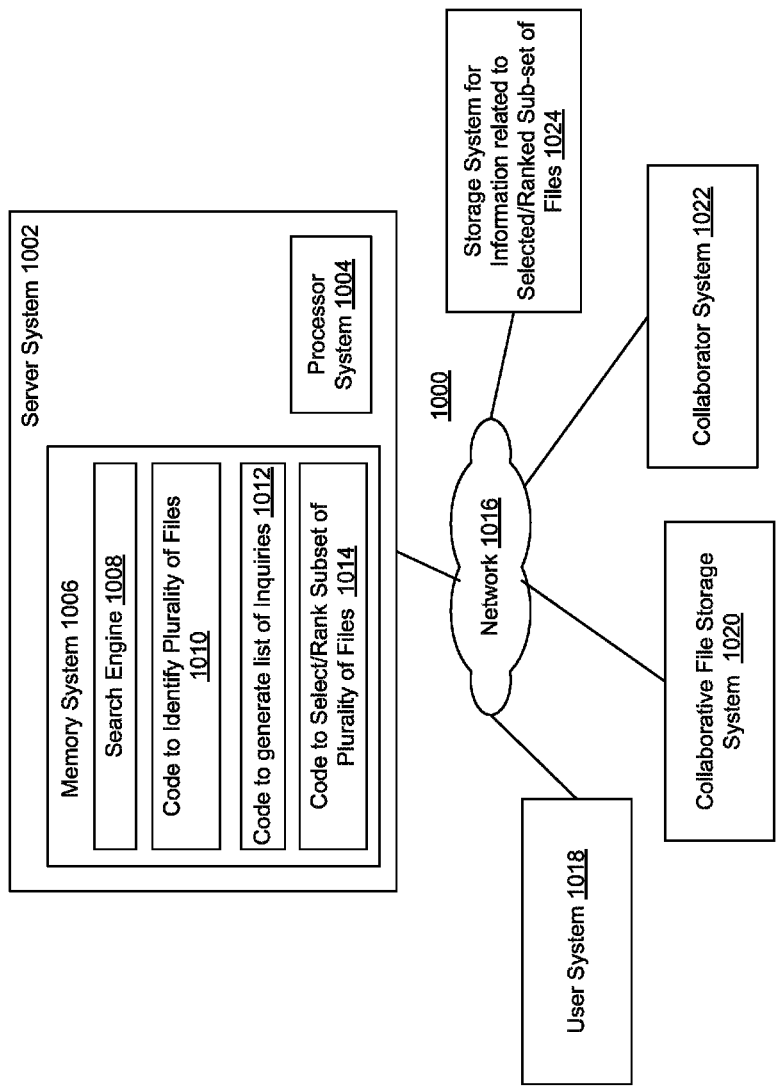
FIG. 10 shows the block diagram of an example system of providing related files to a search result in a collaborative file storage system or desktop file storage.

FIG. 10 shows a block diagram of system 1000, an embodiment of a system of providing related files to a search result. The system consists of server system 1002, network 1016, user system 1018, collaborative file storage system 1020, collaborator system 1022, and storage system for information related to selected/ranked subset of files 1024 among others. In other embodiments, system 1000 may not have all of the elements or features listed and/or may have other elements or features instead of or in addition to those listed.

As shown in FIG. 10, for the described embodiments, server system 1002 includes processor system 1004 and memory system 1006 among others. Server system 1002 consists of on one or more servers connected to the network. Server system 1002 can be a single unit, distributed in various locations, or virtualized. Processor system 1004 may include any one of, some of, any combination of, or all of multiple parallel processors, a single processor, a system of processors having one or more central processors and/or one or more specialized processors dedicated to specific tasks. Also, processor system 1004 may include one or more Digital Signal Processors (DSPs) in addition to or in place of one or more Central Processing Units (CPUs) and/or may have one or more digital signal processing programs that run on one or more CPU.

Memory system 1006 may include, for example, any one of, some of, any combination of, or all of a long-term storage system, such as a hard drive; a short-term storage system, such as random access memory; a removable storage system, such as a floppy drive or a removable drive; and/or flash memory. Memory system 1006 may include one or more machine-readable mediums that may store a variety of different types of information. The term machine-readable medium is used to refer to any medium capable carrying information that is readable by a machine. One example of a machine-readable medium is a computer-readable medium.

In an embodiment, memory system 1006 stores code for search engine 1008, code to identify plurality of files 1010, code to generate a list of inquiries 1012, and code to select/rank subset of plurality of files 1014. Memory system 1006 stores code for search engine 1006 to search the collaborative file storage system for files related to a first file and returns the result to server system 1002. In the described embodiments, the first file can reside in the collaborative file storage system 1020, or collaborator system 1022, or storage system for information related to selected/ranked subset of files 1024 or memory system 1006 or any other storage system. In an embodiment, the search engine searches the abstract of the file. In another embodiment, the search engine searches the entire file for keywords. The results from the search engine are ranked in order of relevancy. The relevancy may be the number of times the keyword appears in the file, and the number of hyperlinks.

The keywords for searching related files are supplied by the code to identify plurality of files 1010. The keywords may be all of or some of frequently used noun phrases, the author of the first file, the authors listed in the references cited in the first file, words from the title, publication date, words related to subject matter. Once the server receives the list of files related to the first file, an inquiry is automatically generated by code to generate a list of inquiries/questionnaire 1012 and sent to one or more collaborators. The list of inquiries is based on the search results. The inquiries include the relevancy of each of files listed as a related file to the first file, the reason for the file being related to the first file. Code to select/rank subset of plurality of files 1014, selects a subset of the files from search results, stores information about the selected subset of files, and provides a hyperlink between the first file and the selected subset of files. Selection of files may also include ranking the files based on the number of selection from the collaborators. In an embodiment, responses from different collaborators can have different weight. Information related to the selected/ranked subset of files is stored. In an embodiment, the information related to the selected/ranked subset of files is stored on a storage system for information related to selected/ranked subset of files 1024. In another embodiment, the information related to the selected/ranked subset of files is stored in memory system 1006. In another embodiment, the information related to the selected/ranked subset of files is stored in the collaborative file storage system. In an embodiment, a hyperlink is created between the first file and the selected subset of files. The hyperlink influences the ranking of search results by the search engine when the first file is involved.

Network 1016 is a network and/or combination of networks of devices that communicate with one another within an enterprise or on the Internet. User system 1018 is a user device connected to the network 1016. User system 1018 selects a file from the collaborative file storage system. The file is selected from a search result or from a listing of files. Collaborative file storage system 1020 is a shared file storage system. All users can access the collaborative file storage system to read and in some cases contribute to the file system. In an embodiment, the collaborative file storage system includes a desktop file storage system. Collaborator system 1022 is a user system in the network. The collaborator system has read and write access to files in the collaborative file storage system. A collaborator of a file may be an author of the file, co-author of the file, an expert in the subject matter or a team member.

An embodiment includes a programmable storage device (such as memory system 1002) readable by a machine (such as, processor system 1004), tangibly embodying a program of instructions when executed by the machine to perform a method of identifying files of a collaborative file storage system having relevance to a first file. The method includes identifying a plurality of files within the collaborative file storage system, wherein the plurality of files each have a relationship with the first file, and wherein the collaborative file storage system includes remote storage of the plurality of files, and allows sharing of the plurality of files between multiple users through a network. The method further includes generating, by a system server, a list of inquiries based on the plurality of files, providing, by the system server, the list of inquiries to at least one collaborator of the first file, receiving from the at least one collaborator at least one response to the list of inquiries, selecting a subset of the plurality of files based on the at least one response, and storing information related to the selected subset of the plurality of files for access if the first file is selected.

Although specific embodiments have been described and illustrated, the described embodiments are not to be limited to the specific forms or arrangements of parts so described and illustrated.

The invention claimed is:

1. A method of identifying files of a file storage system having relevance to a first file, comprising:
   identifying a plurality of files within the file storage system, wherein the plurality of files each have a relationship with the first file, and wherein the file storage system allows sharing of the plurality of files between multiple users through a network;
   generating, by a system server, a list of inquiries based on the plurality of files, wherein the list of inquiries includes search terms used in a search that identified the plurality of files;
   providing, by the system server, the list of inquiries to at least one collaborator of the first file;
   receiving from the at least one collaborator at least one response to the list of inquiries;
   selecting a subset of the plurality of files based on the at least one response;
   storing information related to the selected subset of the plurality of files for access if the first file is selected;
   providing, by the system server, the selected subset of the plurality of files to a user who has performed a search on a search term that yields a plurality of results containing the first file; and
   identifying the at least one collaborator to the user.

2. The method of claim 1, wherein the file storage system includes a collaborative file storage system.

3. The method of claim 1, wherein the file storage system includes a desktop file storage system.

4. The method of claim 1, wherein the at least one collaborator comprises at least one author of the first file.

5. The method of claim 1, further comprising:
generating, by the system server, a second list of inquiries based on the plurality of files;
providing, by the system server, the second list of inquiries to at least one second collaborator of the plurality of files;
receiving from the at least one second collaborator of the plurality of files at least one second response to the second list of inquiries;
re-selecting the subset of the plurality of files based on the at least one response and the at least one second response;
storing information related to the re-selected subset of the plurality of files for access if the first file is selected.

6. The method of claim 1, further comprising providing, by the system server, the selected subset of the plurality of files to a user that selects the first file.

7. The method of claim 6, wherein identifying the at least one collaborator comprises providing the user with a name, qualifications or institution of the at least one collaborator.

8. The method of claim 1, wherein identifying the at least one collaborator comprises providing the user with a name, qualifications or institution of the at least one collaborator.

9. The method of claim 1, further comprising providing a hyperlink between the first file and the selected subset of the plurality of files, wherein the hyperlink influences a ranking of search results that include at least one of the first file and the plurality of files.

10. The method of claim 1, wherein the plurality of files are each identified by a plurality of subject-matter searches, wherein each search identifies one of the plurality of files and the first file.

11. The method of claim 10, wherein at least one of the plurality of subject-matter searches is refined by the at least one response.

12. The method of claim 10, wherein at least one of the plurality of subject-matter searches uses a keyword search application programming interface to access records in a file storage system.

13. The method of claim 1, wherein the list of inquiries includes search terms used in a search that identified the first file and the plurality of files, thereby establishing a relationship between the first file and the plurality of files by text analysis or collaborative filtering.

14. The method of claim 13, wherein the search terms comprise strings of words.

15. The method of claim 13, wherein the search terms comprise noun phrases.

16. The method of claim 13, wherein the search terms comprise collaborator names cited by the first file.

17. The method of claim 13, wherein the search terms comprise a term within the first file.

18. The method of claim 13, the search is based on at least one of a word string, a collaborator, or an image.

19. The method of claim 13, wherein the search terms are included within text of citations of the first file.

20. The method of claim 1, wherein each of the plurality of files include a publication date, wherein each of the publication dates are more recent than at least one of a first revision or a last revision date of the first file.

* * * * *